United States Patent [19]

Miller

[11] Patent Number: 4,575,455

[45] Date of Patent: Mar. 11, 1986

[54] PROCESS FOR REMOVING HYDROGEN SULFIDE WITH REDUCED FOULING

[75] Inventor: Richard F. Miller, Humble, Tex.

[73] Assignee: Atlantic Richfield Company, Los Angeles, Calif.

[21] Appl. No.: 674,206

[22] Filed: Nov. 23, 1984

[51] Int. Cl.$^4$ .................. C01B 17/16; C01B 31/20
[52] U.S. Cl. .................. 423/228; 423/229; 252/397
[58] Field of Search .................. 423/385, 387, 228; 252/397

[56] References Cited

U.S. PATENT DOCUMENTS

| | | | |
|---|---|---|---|
| 4,113,837 | 9/1978 | Kendall et al. | 423/228 |
| 4,343,777 | 8/1982 | Dannhorn et al. | 423/228 |
| 4,400,368 | 8/1983 | Diaz | 423/228 |

OTHER PUBLICATIONS

Baker Kirk–Othmer Encyclopedia of Chemical Technology, 1966, 493, 500–508, Nark et al., editors.

*Primary Examiner*—Gregory A. Heller
*Attorney, Agent, or Firm*—Coleman R. Reap

[57] ABSTRACT

A gas scrubbing operation wherein a mixture of gases is scrubbed with a gas scrubbing medium to remove at least one gas component from the mixture is improved by reducing the fouling of apparatus used in the scrubbing operation by adding to the scrubbing medium an antifoulant effective amount of a hydroxylamine compound.

9 Claims, No Drawings

PROCESS FOR REMOVING HYDROGEN SULFIDE WITH REDUCED FOWLING

FIELD OF THE INVENTION

This invention relates to methods of inhibiting fouling of alkanol amine gas scrubbing equipment by injecting a hydroxyl amine antifoulant composition into a stream of an alkanolamine scheduled to be heated in a reboiler, heat exchanger, process heater, or associated filters and so forth, whereby the heat exchanger, scrubbing vessel, associate filters and so forth are able to function for longer periods of time by virtue of the inhibitor minimizing the formation of both organic and inorganic deposits.

BACKGROUND

Fouling of petroleum processing equipment occurs continuously during the period when petroleum or its derivatives are being processed in the equipment. Generally, fouling is caused by the gradual buildup of a layer of polymeric material resulting from the thermal polymerization of unsaturated materials which are present in the material processed. Gaseous materials are frequently scrubbed to remove undesired components. Hydrogen sulfide and other impurities are commonly removed from gas streams by scrubbing with an alkanolamine composition. That operation leads to formation of iron sulfides creating an additional fouling problem. Ultimately fouling becomes a problem of such magnitude that it becomes necessary to take the equipment out of service for cleaning. Cleaning is an expensive, time consuming operation and consequently methods of preventing fouling, or at least significantly reducing the rate of fouling, are constantly being sought. The most economical method of reducing the fouling rate in process equipment is to add chemicals which inhibit fouling, called "antifoulants", to the feed stream being processed.

PRIOR ART

U.S. Pat. No. 3,148,225 to Albert employs dialkylhydroxylamine for inhibiting popcorn polymers in SBR rubbers. Prior workers have understood that dialkylhydroxylamine compounds react with free radicals to prevent undesired formation of polymers. Further inhibition of popcorn polymerization is effected by Gross (U.S. Pat. No. 3,426,063) by use of an arylhydroxylamine. U.S. Pat. No. 2,965,685 to Campbell discloses inhibition of vinyl aromatic monomer polymerization by using from 5 ppm to 5 percent dialkylhydroxylamine in the vinyl aromatic monomer. Furthermore, Mayer-Mader (U.S. Pat. No. 3,878,181) teaches termination of an aqueous emulsion polymerization of chloroprene or dichlorobutadiene by addition of diethylhydroxylamine and Sato (U.S. Pat. No. 3,849,498) discloses that diethylhydroxylamine is effective as a polymerization inhibitor for alcoholic solutions of unsaturated aldehydes. U.S. Pat. No. 3,392,204 to Elmer discloses that styrene can be stabilized against polymerization by dosing with a small amount of a diethylhydroxylamine salt of certain carboxylic acids.

Although some of the published literature concerned with antifoulant compositions suggest that some antifoulants might also serve to inhibit the thermal polymerization of unsaturated components of the hydrocarbonaceous liquid subjected to elevated temperatures, there has been no pattern of transfer of technology from the polymer inhibition field to antifoulant composition technology.

Gerbrand (U.S. Pat. No. 4,386,224) discloses that the color of alkyl phenols can be stabilized and discoloration inhibited by the presence of a small amount of diethylhydroxylamine.

Albert (U.S. Pat. No. 3,333,001) stabilized dialkylhydroxylamines themselves by use of mercaptobenzothiazole.

U.S. Pat. No. 4,400,368 (Zaida) discloses a method of removal of hydrogen sulfide and carbon dioxide from sour gases by contacting the sour gases with an aqueous solution of certain polyvalent metal chelates. The chelate life is taught to be improved by the presence of a stabilizing amount of certain nitrogen compounds including, inter alia, diethylhydroxylamine. Also, gas scrubbing units are known wherein mono-, di- or triethanolamines are used to remove $H_2S$, carbon dioxide and the like from gases accumulated as the result of fractionation, cracking, coking and so forth. Several problems exist with these gas scrubbing units. Corrosion results from the reaction of iron and free $H_2S$ in the unit forming iron sulfide and which fouls reboilers due to both iron sulfide accumulation and the polymerization of unsaturated aliphatic hydrocarbons contained in the gas scrubbed.

Further, fouling is made more severe by the presence of trace amounts of oxygen. Oxygen can promote the sloughing of iron sulfide off the walls of the unit which increases the amount of iron sulfide available to foul reboilers. Additionally, polymerization can be enhanced by the presence of oxygen due to the formation of peroxides.

Currently, the antifoulant inhibitor of choice widely used in alkanolamine scrubbers is hydrazine, $NH_2NH_2$. Problems associated with the use of this material include toxicity, its explosive nature and lack of ability to inhibit additional polymerization effectively. Other products employed in the past have been phenols, catechols and hydroquinones. However, these have demonstrated adverse affects by promoting the sloughing of iron sulfide off vessel walls.

Under operating conditions employed in processing refinery gases through alkanolamine units, the ideal antifoulant composition would avoid the above-noted adverse properties and above all would have the ability to remove trace oxygen from the system, inhibit unsaturated hydrocarbon polymerization and inhibit the sloughing of iron sulfide off units walls. It has now been discovered that the presence of certain hydroxylamines in the alkanol amine scrubbing unit serves to effectively minimize such fouling of the scrubbing unit equipment.

Accordingly, it is an object of the present invention to provide an antifoulant for alkanol amine gas scrubbing units. It is another object of the present invention to present a method of enhancing antifoulant protection for gas scrubbing equipment. These and other objects of the invention are set forth in the following description and examples of the invention.

SUMMARY OF THE INVENTION

The improved antifoulant effects afforded by the present invention are achieved by injecting into a stream of alkanol amine scheduled for use in scrubbing gases a fouling preventing amount of certain hydroxylamines.

DETAILED DESCRIPTION OF THE INVENTION

The hydroxylamine compounds used in the present invention correspond to a compound of the structural formula

RR'NOH wherein R and R' are the same or different and each is hydrogen or alkyl having up to about 10, and preferably 2 to 6, carbon atoms. Although hydroxylamines having more than 10 carbon atoms in each alkyl group may be useful in the invention it is preferred that compounds containing 10 or fewer carbon atoms in each alkyl group be used in the invention because the latter compounds are commercially available. Mixtures of two or more hydroxylamines can also be advantageously used in the practice of the invention.

Suitable hydroxylamines include hydroxylamine ($NH_2OH$), N,N-diethydroxylamine, N,N-dibutylhydroxylamine, N,N-butylethylhydroxylamine, N,N-dibenzylhydroxylamine, N-hydroxypiperidine, and so forth. Preferred hydroxylamines are $NH_2$—OH, diethylhydroxylamine and dibutylhydroxylamine.

The hydroxylamine compound may be used as the free amine or as an amine salt of a mineral acid. Thus, the hydroxylamine compound hydrochlorides or sulfates are also useful as antifoulants in this invention.

The antifoulants of this invention may include other additives, if desired. For example, other antifoulants may be used in combination with the hydroxylamine antifoulants of this invention, or dispersants, corrosion inhibitors and so forth may be combined with the hydroxylamine compounds to improve the efficiency thereof or to provide additional protection to the process equipment.

The antifoulants of the invention can be introduced into the equipment to be protected by any conventional method. In a preferred embodiment it is introduced into an alkanol amine stream just upstream of the point of introduction into the scrubbing unit by any suitable means, such as by the use of a proportionating pump. The antifoulant hydroxylamine compound may be added as a concentrate or as a solution or a slurry in a liquid diluent which is compatible with the alkanolamine being treated. Suitable solvents include water, alcohols, e.g. methanol and various alkyl or alkanolamine (e.g., MEA, TEA), and so forth. The concentration of hydroxylamine compound in the solvent is desirably in the range of about 10 to 90 weight percent and preferably about 25 to 75 weight percent based on the total weight of hydroxylamine and solvent.

As indicated above, the preferred embodiment of this invention relates to protecting equipment used in alkanolamine gas scrubbing operations. That equipment and the scrubbing operation itself are well known. See, for example, "Hydrocarbon Processing" April 1979, pages 104, 105 and 107. Generally, the scrubbing operation involves an intimate contact of the gas to be scrubbed with an alkanolamine (e.g., monoethanol amine, diethanol amine, diglycol amine or diisopropanol amine) to remove gas components which react with the alkanolamine.

The hydroxylamine compound is used at the concentration which is effective to provide the desired protection against fouling. It has been determined that amounts in the range of about 0.01 to 0.3% based on the weight of the alkanolamine stream being treated will afford ample protection against fouling. Generally, as related to residual oxygen, the ratio of residual oxygen concentration to inhibitor is $NH_2$—$NH_2:O_2$ of about 1:1 wherein the hydroxylamine compound:$O_2$ is about 1:4. For most applications the inhibitor is used in amounts in the range of about 500 to 1500 ppm.

The following examples will serve to further illustrate the invention.

EXAMPLE I

To evaluate potential antifoulants for their ability to reduce the levels of oxygen in alkanolamine scrubbing units, mineral oil samples were purged with oxygen under pressures of about 26 kg/cm² at 228° C. The dissolved oxygen concentration was determined by an oxygen sensing probe and the determination repeated after treatment with the compounds listed below. Results are tabulated in Table 2.

TABLE 2

| Product | Dissolved Oxygen (mg/L) | | % Reduction dissolved $O_2$ |
| --- | --- | --- | --- |
| | Initial Value | Final Value | |
| Sodium Sulfite ($Na_2SO_3$) | 3.00 | 0.09 | 96.8 |
| Hydrazine ($N_2H_4$) | 3.75 | 0.10 | 97.3 |
| Hydroxylamine hydrochloride | 3.40 | 0.06 | 98.2 |
| N,N—diethylhydroxyamine | 3.70 | 0.06 | 98.4 |

EXAMPLE II

To determine dosage response data for potential antifoulants, dissolved oxygen levels were measured as the function of antifoulant concentration. Results are tabulated in Tables 3, 4 and 5 below.

TABLE 3

Dose Response Data: Hydrazine ($N_2H_4$); 3.30 mg/L Dissolved Oxygen

| Concentration (mg/L) | Final $O_2$ (mg/L) | % Reduction |
| --- | --- | --- |
| 2.1 | 2.60 | 21.2 |
| 4.2 | 2.00 | 39.4 |
| 6.3 | 1.70 | 48.5 |
| 8.4 | 1.50 | 54.5 |
| 10.5 | 1.15 | 65.2 |
| 12.6 | 0.88 | 73.3 |
| 16.8 | 0.24 | 92.7 |
| 18.9 | 0.08 | 97.8 |

TABLE 4

Dose Response Data: Hydroxylaminehydrochloride; 3.75 mg/L Dissolved Oxygen

| Concentration (mg/L) | Final $O_2$ (mg/L) | % Reduction |
| --- | --- | --- |
| 2.85 | 3.05 | 18.7 |
| 5.7 | 1.90 | 49.3 |
| 8.6 | 1.10 | 70.7 |
| 11.4 | 0.49 | 86.9 |
| 14.2 | 0.21 | 94.4 |
| 17.1 | 1.09 | 97.6 |

TABLE 5

Dose Response Data: N,N—diethylhydroxylamine; 3.70 mg/L Dissolved Oxygen

| Concentration (mg/L) | Final $O_2$ (mg/L) | % Reduction |
| --- | --- | --- |
| 12 | 1.20 | 67.6 |
| 18 | 0.41 | 88.9 |

TABLE 5-continued

Dose Response Data: N,N—diethylhydroxylamine; 3.70 mg/L Dissolved Oxygen

| Concentration (mg/L) | Final $O_2$ (mg/L) | % Reduction |
|---|---|---|
| 24 | 0.27 | 92.7 |
| 30 | 0.06 | 98.4 |

What is claimed is:

1. In a gas scrubbing operation wherein a mixture of gases containing hydrogen sulfide is scrubbed with an alkanolamine gas scrubbing medium to remove hydrogen sulfide from the mixture, the improvement which comprises reducing the fouling of apparatus used in the scrubbing operation by adding to the scrubbing medium an antifoulant effective amount of hydroxylamine compound.

2. A gas scrubbing operation according to claim 1 wherein the hydroxylamine compound is added to the scrubbing medium in an amount of from 0.01 to 0.3% based on the scrubbing medium.

3. A gas scrubbing operation according to claim 1 wherein the hydroxylamine compound is added to the scrubbing medium as a solution in a solvent selected from water, alcohols, amines, alkanolamines and mixtures thereof.

4. A gas scrubbing operation according to claim 1 wherein the hydroxylamine is hydroxylamine hydrochloride.

5. A gas scrubbing operation according to claim 1 wherein the hydroxylamine is dihydroxylamine sulfate.

6. A gas scrubbing operation according to claim 1 wherein the hydroxylamine is N,N-diethylhydroxylamine.

7. A gas scrubbing operation according to claim 1 wherein the hydroxylamine is N,N-dibutylhydroxylamine.

8. A gas scrubbing operation according to claim 1 wherein the hydroxylamine is N,N-dibenzylhydroxylamine.

9. A gas scrubbing operation according to claim 1 wherein the hydroxylamine is N-hydroxypiperdine.

* * * * *